United States Patent
Redwine et al.

(10) Patent No.: US 6,210,078 B1
(45) Date of Patent: Apr. 3, 2001

(54) METHODS FOR THE IN SITU REMOVAL OF A CONTAMINANT FROM SOIL

(75) Inventors: James C. Redwine, Birmingham; David W. Morris, Chelsea; David L. Drummonds, Homewood, all of AL (US)

(73) Assignee: Southern Company Services, Birmingham, AL (US)

( * ) Notice: Subject to any disclaimer, the term of this patent is extended or adjusted under 35 U.S.C. 154(b) by 0 days.

(21) Appl. No.: 09/324,298

(22) Filed: Jun. 2, 1999

(51) Int. Cl.$^7$ .............................. A62D 3/00; B08B 3/04; B08B 3/10; B08B 6/00

(52) U.S. Cl. ..................... 405/263; 405/128; 588/221; 588/222; 134/28; 210/747; 205/687; 205/766; 205/771

(58) Field of Search .................................. 405/128, 263; 205/687, 688, 766, 771; 134/28; 588/221, 222, 204, 249; 210/747

(56) References Cited

U.S. PATENT DOCUMENTS

| | | |
|---|---|---|
| 3,201,268 | 8/1965 | Hemwall . |
| 4,118,243 | 10/1978 | Sandesara . |
| 4,272,494 | 6/1981 | Ljubman et al. . |
| 4,289,594 | 9/1981 | Alpaugh et al. . |
| 4,671,882 | 6/1987 | Douglas et al. . |

(List continued on next page.)

FOREIGN PATENT DOCUMENTS

| | | | | |
|---|---|---|---|---|
| 000548765 | * | 6/1993 | (EP) ................................. | 405/128 |
| 51-69057 | * | 6/1976 | (JP) .................................. | 405/263 |
| 093006952 | * | 4/1993 | (WO) ................................ | 405/128 |

OTHER PUBLICATIONS

Peters et al., "Columnar Studies For Remediation of Arsenic Contaminated Soils by Chelant Exraction" Extended Abstracts for Special Symposium, Atlanta, GA; Industrial & Engineering Chemistry Division, American Chemical Society, Sep. 17–20, 1995; pp. 1133–1135.

(List continued on next page.)

Primary Examiner—William Neuder
Assistant Examiner—Alexandra K. Pechhold
(74) Attorney, Agent, or Firm—Needle & Rosenberg, P.C.

(57) ABSTRACT

The invention relates to a method for removing a contaminant in situ from soil containing the contaminant, by contacting the soil containing the contaminant with a reagent in situ to remove the contaminant from the soil and form a mixture; removing the mixture from the soil; and removing the contaminant from the mixture, wherein the reagent is not citric acid. The invention further relates to a method for removing a contaminant in situ from soil containing the contaminant, by contacting the soil containing the contaminant with a reagent in situ and mobilizing the contaminant by electroremediation to form a mixture containing the contaminant; and removing the contaminant from the mixture. The invention further relates to a method for removing a contaminant from soil in situ containing the contaminant, by contacting the soil containing the contaminant with a chelate in situ to form a mixture containing a contaminant-chelate complex; removing the mixture from the soil; and contacting the mixture with an ion exchange resin, whereby the contaminant-chelate complex is separated from the mixture. The invention further relates to a method of removing a contaminant in situ from soil containing the contaminant, by contacting the soil containing the contaminant in situ with a chelate to form a first mixture containing a contaminant-chelate complex; removing the first mixture from the soil; chemically destroying the contaminant-chelate complex of the first mixture to produce a second mixture containing the contaminant; and removing the contaminant from the second mixture.

57 Claims, 9 Drawing Sheets

U.S. PATENT DOCUMENTS

| | | | | |
|---|---|---|---|---|
| 4,737,356 | | 4/1988 | O'Hara et al. . | |
| 4,820,417 | | 4/1989 | Buchmeier et al. . | |
| 4,846,978 | | 7/1989 | Leggett et al. . | |
| 5,008,019 | * | 4/1991 | Trost | 210/747 |
| 5,013,453 | | 5/1991 | Walker . | |
| 5,162,600 | | 11/1992 | Cody et al. . | |
| 5,193,936 | | 3/1993 | Pal et al. . | |
| 5,202,033 | | 4/1993 | Stanforth et al. . | |
| 5,209,604 | | 5/1993 | Chou . | |
| 5,240,570 | * | 8/1993 | Chang et al. | 405/128 |
| 5,252,003 | * | 10/1993 | McGahan | 405/128 |
| 5,292,456 | | 3/1994 | Francis et al. . | |
| 5,310,488 | | 5/1994 | Hansen et al. . | |
| 5,324,433 | * | 6/1994 | Grant et al. | 210/747 |
| 5,342,449 | * | 8/1994 | Holbein et al. | 134/2 |
| 5,398,756 | * | 3/1995 | Brodsky et al. | 405/128 |
| 5,405,509 | | 4/1995 | Lomasney et al. . | |
| 5,415,744 | * | 5/1995 | Jacobs | 588/204 |
| 5,435,895 | * | 7/1995 | Lindgren et al. | 588/204 |
| 5,453,133 | * | 9/1995 | Sparks et al. | 134/25.1 |
| 5,458,747 | * | 10/1995 | Marks et al. | 588/204 |
| 5,476,992 | * | 12/1995 | Ho et al. | 588/204 |
| 5,492,633 | | 2/1996 | Moniwa et al. . | |
| 5,616,235 | | 4/1997 | Acar et al. . | |
| 5,640,701 | | 6/1997 | Grant et al. . | |
| 5,674,176 | | 10/1997 | Pierce . | |
| 5,676,819 | * | 10/1997 | Lindgren et al. | 205/687 |
| 5,700,107 | | 12/1997 | Newton . | |
| 5,725,752 | * | 3/1998 | Sunderland et al. | 205/687 |
| 5,741,427 | * | 4/1998 | Watts et al. | 210/747 |
| 5,769,961 | | 6/1998 | Peters et al. . | |
| 5,855,797 | | 1/1999 | Luong et al. . | |
| 5,861,090 | * | 1/1999 | Clarke et al. | 205/688 |
| 5,948,441 | * | 9/1999 | Lenk et al. | 424/489 |
| 5,951,457 | * | 9/1999 | James | 405/128 |
| 5,975,799 | * | 11/1999 | Carrigan et al. | 405/128 |
| 5,976,348 | * | 11/1999 | Pubh | 205/688 |

OTHER PUBLICATIONS

Peters et al., "Chelant Extraction and "Redox" Manipulation For Remediation of Heavy Metal Contaminated Soils" Extended Abstracts for Special Symposium, Atlanta, GA; Industrial & Engineering Chemistry Division, American Chemical Society, Sep. 17–20, 1995; pp. 1125–1128.

Peters et al., "Desorption of Arsenic From Contaminated Soils Using Chelant Extraction: Batch Feasibility Studies", Book of Abstracts for the Special Symposium, Atlanta, GA; Industrial & Engineering Chemistry Division, American Chemical Society, Sep. 19–21, 1994, pp. 429–432.

Redwine "Soil Flushing, Iron Coprecipitation, And Ceramic Membrane Filtration Innovative Technologies For Remediating Arsenic–Contaminated Soil and Groundwater", Extended Abstracts for Special Symposium, Atlanta, GA; Industrial & Engineering Chemistry Division, American Chemical Society, Sep. 17–20, 1995; pp. 1129–1132.

Hornbuckle et al., "Commercial Demonstration of Iron Coprecipitation Technology", Georgia Water and Pollution Control Association, Industrial Pollution Control Conference and Exposition, Feb. 7–9, 1995, pp. 1–10.

Nebrig, Jr., "Arsenic Removal By Iron Coprecipitation and Ceramic Membrane Filtration", Georgia Water and Pollution Control Association, Industrial Pollution Control Conference and Exposition, Feb. 7–9, 1995, pp. 1–10.

Mok, W.M. et al., "Mobilizition of Arsenic In Contaminated River Waters," Arsenic in the Environment, Part I: Cycling and Characterization, John Wiley and Sons, Inc., 1994, pp.111.

"Recent Developments for In Situ Treatment of Metal Contaminated Soils," United States Environmental Protection Agency, Mar. 1997.

* cited by examiner

METHODS FOR THE IN SITU REMOVAL OF A CONTAMINANT FROM SOIL

FIELD OF THE INVENTION

The present invention relates to methods for the in situ removal of a contaminant from soil.

BACKGROUND OF THE INVENTION

The removal of toxic and hazardous materials from the environment is a growing concern. In particular, the removal of contaminants such as organic compounds and heavy metals from the soil is the focus of intense research. The contamination of groundwater and, ultimately, drinking water is the driving force behind the extensive research being conducted in order to remove toxic and hazardous contaminants from the soil.

Numerous techniques for the remediation of soil are disclosed in the art. One approach involves the excavation of soil followed by treating the soil with additives and chemicals to remove the contaminant. U.S. Pat. No. 5,674,176 to Pierce discloses the addition of phosphoric acid, monocalcium phosphate, monoammonium phosphate and diammonium either alone or in combination with Portland cement to excavated soil samples. U.S. Pat. No. 5,640,701 to Grant et al. disclose a method for removing radioactive contaminants from excavated soil by treating the soil with an extracting agent composed of potassium carbonate, potassium bicarbonate, sodium carbonate, sodium bicarbonate, sodium chloride, acetic acid, sodium hypochloride, ammonium carbonate, and ammonium bicarbonate. U.S. Pat. No. 5,193,936 to Pal et al. disclose treating excavated soil with a sulfate compound followed by a phosphate reagent.

The treatment of excavated soil has a number of disadvantages. First, it is expensive to operate excavating and trucking equipment needed to remove the contaminated soil. Second, the transportation of hazardous material is monitored by strict regulations. Finally, it has been shown in the art that some methods used to treat the excavated soil are not effective for the removal of heavy metals, such as lead, from the soil.

Another method involves the addition of additives or chemicals directly into the soil in order to convert the contaminant into a non-leachable form. U.S. Pat. No. 5,202,033 to Stanforth et al. disclose the addition of a phosphate, a carbonate, or a chemical reducing additive into the soil or waste. The contaminant is rendered nonhazardous, and is not removed from the soil. Indeed, Stanforth et al. disclose that the removal of the contaminant from the soil is lengthy and expensive.

The removal of contaminants from waste water has also been disclosed in the art. U.S. Pat. No. 4,289,594 to Aplaugh; U.S. Pat. No. 5,310,488 to Hansen et al.; U.S. Pat. No. 5,013,453 to Walker; U.S. Pat. No. 4,820,417 to Buchmeier; U.S. Pat. No. 4,272,494 to Ljubman et al.; U.S. Pat. No. 4,118,243 to Sandesara; U.S. Pat. No. 5,492,633 to Moniwa et al.; and U.S. Pat. No. 4,846,978 to Legget et al. disclose the removal of contaminants from waste water and aqueous solutions by chemical or physical means. These references, however, do not disclose the removal of contaminants from soil.

An alternative to treating excavated soil is in situ soil remediation. U.S. Pat. No. 5,769,961 to Peters et al. disclose a process for the in situ remediation of soil containing arsenic. The process involves contacting the soil with an aqueous extraction solution, directing the extractant solution through the soil so that the extractant solution interacts with the arsenic contaminant, and collecting the extractant solution containing the arsenic contaminant. Peters et al. disclose that iron and aluminum salts can be added to the extractant solution containing the arsenic contaminant in order to bring the arsenic contaminant out of solution. When an extractant, such as citric acid, is used in the process of Peters et al., the process is very inefficient with respect to arsenic removal because floc formation is inhibited by the citric acid. There is no disclosure in Peters et al. to remove the extractant from the solution prior to removing the arsenic by floc formation. Additionally, there is no disclosure in Peters et al. for using a membrane, such as a ceramic membrane, or an ion exchange resin to remove the arsenic contaminant from the extraction solution. Finally, Peters et al. does not disclose the mobilization of the contaminant in soil by electroremediation.

In light of the above it would be very desirable to have an efficient method for the in situ removal of a contaminant from soil. The present invention solves such a need in the art while providing surprising advantages. The present invention provides a method that effectively removes a contaminant from soil at an accelerated rate without having to treat excavated soil.

SUMMARY OF THE INVENTION

In accordance with the purpose(s) of this invention, as embodied and broadly described herein, this invention, in one aspect, relates to a method for removing a contaminant in situ from soil containing the contaminant, comprising:
  a) contacting the soil containing the contaminant in situ with a reagent to remove the contaminant from the soil and to form a mixture comprising the contaminant;
  b) removing the mixture from the soil;
  c) forming a floc in the mixture to form a contaminant-floc complex; and
  d) contacting the mixture containing the contaminant-floc complex with a ceramic membrane to thereby remove the contaminant-floc complex,
wherein the reagent is not citric acid.

The invention further relates to a method for removing an arsenic compound in situ from soil containing the arsenic compound, comprising:
  a) contacting the soil containing the arsenic compound in situ with phosphoric acid to form a mixture;
  b) mobilizing the mixture by electroremediation;
  c) removing the mixture from the soil;
  d) adding an iron salt to the mixture to form an arsenic-floc complex; and
  e) contacting the mixture containing the arsenic-floc complex with a ceramic membrane to thereby remove the arsenic-floc complex.

The invention further relates to a method for removing a contaminant in situ from soil containing the contaminant, comprising:
  a) contacting the soil containing the contaminant in situ with a reagent to form a mixture;
  b) mobilizing the mixture by electroremediation;
  c) removing the mixture from the soil; and
  d) removing the contaminant from the mixture.

The invention further relates to a method for removing a contaminant in situ from soil containing the contaminant, comprising:
  a) contacting the soil containing the contaminant in situ with a chelate to form a mixture comprising a contaminant-chelate complex;

b) removing the mixture from the soil; and c) contacting the mixture with an ion exchange resin, whereby the contaminant-chelate complex is separated from the mixture.

The invention relates to a method for removing an arsenic compound in situ from soil containing the arsenic compound, comprising:

a) contacting the soil containing the arsenic compound with citric acid in situ to form a mixture comprising an arsenic-citric acid complex;

b) mobilizing the mixture by electroremediation;

c) removing the mixture from the soil; and d) contacting the mixture with an anionic ion exchange resin, whereby the arsenic-citric acid complex is separated from the mixture.

The invention further relates to a method for removing a contaminant in situ from soil containing the contaminant, comprising:

a) contacting the soil containing the contaminant with a chelate in situ to form a mixture comprising a contaminant-chelate complex;

b) mobilizing the mixture by electroremediation;

c) removing the mixture from the soil; and d) contacting the mixture with an ion exchange resin, whereby the contaminant-chelate complex is separated from the mixture.

The invention further relates to a method of removing a contaminant in situ from soil containing the contaminant, comprising:

contacting the soil containing the contaminant with a chelate in situ to form a first mixture comprising a contaminant-chelate complex;

b) removing the first mixture from the soil;

c) chemically destroying the contaminant-chelate complex of the first mixture to produce a second mixture comprising the contaminant; and d) removing the contaminant from the second mixture.

The invention relates to a method for removing an arsenic compound in situ from soil containing the arsenic compound, comprising:

a) contacting the soil containing the arsenic compound with citric acid in situ to form a first mixture comprising an arsenic-citric acid complex;

b) mobilizing the first mixture by electroremediation;

c) removing the first mixture from the soil;

d) chemically destroying the arsenic-citric acid complex of the first mixture by ozonation, oxidation, or a combination thereof to produce a second mixture comprising the arsenic compound;

e) adding an iron salt to the second mixture to produce a third mixture comprising an arsenic-floc complex; and f) filtering the third mixture comprising the arsenic-floc complex with a ceramic membrane.

The invention further relates to a method of removing a contaminant in situ from soil containing the contaminant, comprising:

a) contacting the soil containing the contaminant with a chelate in situ to form a first mixture comprising a contaminant-chelate complex;

b) mobilizing the first mixture by electroremediation;

c) removing the first mixture from the soil;

d) chemically destroying the contaminant-chelate complex of the first mixture to produce a second mixture comprising the contaminant; and e) removing the contaminant from the second mixture.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

Referring to the drawings, like numbers indicate like parts throughout the views.

DETAILED DESCRIPTION OF THE INVENTION

Figure 1:
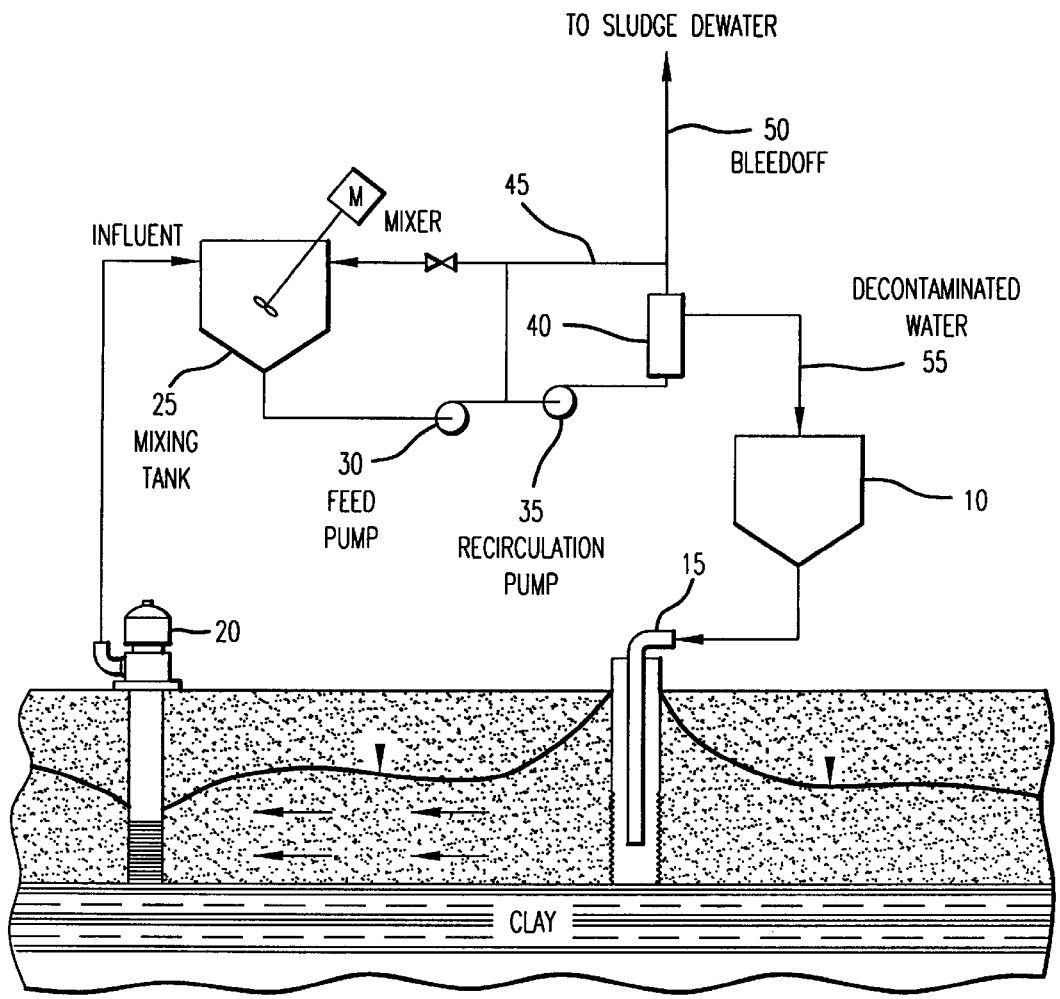
FIG. 1 is a schematic drawing that depicts one embodiment of the present invention for the in situ removal of a contaminant from soil. In this embodiment, a reagent is introduced to the soil from the feed tank (10), and the mixture containing the contaminant is collected at the recovery well (20) and fed into the mixing tank (25). In the mixing tank, floc formation is induced by the addition of a salt to the mixture containing the contaminant to produce a contaminant-floc complex. The mixture containing the contaminant-floc complex is then fed through the filter, clarifier, or membrane (40) in order to remove the contaminant-floc complex. The decontaminated mixture is then fed back into the feed tank via line (55), where it is re-introduced into the soil with additional reagent.

The present invention may be understood more readily by reference to the following detailed description of preferred embodiments of the invention and the Examples included therein.

Before the present methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

The term "in situ" is defined as the continuous or repeated contacting of the contaminated soil with a reagent or chelate, wherein the soil is not excavated from the ground. That is, the soil remains in place while the treatment of the invention is performed. This is also referred to as "soil flushing" in the present application.

The term "mobilizing" is defined as moving the contaminant through the soil once the reagent or chelate has been added to the soil.

In Situ Removal of a Contaminant from Soil Using a Reagent

In accordance with the purpose(s) of this invention, as embodied and broadly described herein, this invention, in one aspect, relates to a method for removing a contaminant in situ from soil containing the contaminant, comprising:
  a) contacting the soil containing the contaminant in situ with a reagent to remove the contaminant from the soil and to form a mixture comprising the contaminant;
  b) removing the mixture from the soil;
  c) forming a floc in the mixture to form a contaminant-floc complex; and
  d) contacting the mixture containing the contaminant-floc complex with a ceramic membrane to thereby remove the contaminant-floc complex,
wherein the reagent is not citric acid.

The invention further relates to a method for removing a contaminant in situ from soil containing the contaminant, comprising:
  a) contacting the soil containing the contaminant in situ with a reagent to form a mixture;
  b) mobilizing the mixture by electroremediation;
  c) removing the mixture from the soil; and
  d) removing the contaminant from the mixture.

The addition of a reagent to the contaminated soil can effectively remove the contaminant from the soil. The term "reagent" is defined herein as any chemical or additive that can chemically or physiochemically react with the contaminant, which promotes the removal of the contaminant from the soil. The reagent can also interact with the soil so that the reagent displaces the contaminant from the soil.

Compounds that can be used as reagents in the present invention include, but are not limited to, Lewis acids, Lewis bases, Bronsted acids, Bronsted bases, or a combination thereof. Chelates as used in the present invention fall under the generic group "reagent." The reagent used depends upon the contaminant to be removed. In one embodiment, the reagent comprises a phosphorus compound. In another embodiment, the reagent comprises a phosphate. Examples of reagents useful in the present invention include, but are not limited to, oxalic acid, oxalate anion, phosphoric acid, phosphate anion, polyvinylsulfonic acid, polyvinylsulfonate anion, or a combination thereof. In a preferred embodiment, the reagent is phosphoric acid.

Citric acid is not used as a reagent of the present invention. If citric acid is present in the mixture that contains the contaminant, the citric acid typically prevents floc formation when a salt is added to the mixture, which ultimately results in the inability to remove the contaminant from the mixture. For example, when ferric chloride is added to a mixture containing citric acid and the contaminant, no floc formation was observed.

Typically, the reagent is added to the soil as a solution, preferably an aqueous solution. In one embodiment, the reagent comprises an aqueous solution of one part by weight reagent and from 100 to 10,000 parts by weight water. The addition of an organic solvent can also be used in combination with the aqueous reagent in order to facilitate the solubilization of the reagent in water. Additionally, the organic solvent can facilitate the solubilization of the contaminant into the reagent. Examples of organic solvents include, but are not limited to, alcohols, esters, carboxylic acids, or a combination thereof. In one embodiment, when an alcohol is used, the alcohol is methanol or ethanol.

The selection of the reagent is dependent upon the contaminant that is going to be removed for the soil. In one embodiment, phosphoric acid is the reagent used to remove arsenic compounds from the soil.

The soil can be contacted with the reagent using techniques known in the art. In one embodiment, the reagent can be introduced to the soil by injection, gallery infiltration, basin infiltration, trench infiltration, surface infiltration, irrigation, spray, flooding, sprinklers, leach fields, vertical wells, or horizontal wells. The technique used to introduce the reagent to the soil depends upon the type of soil to be treated.

A schematic drawing depicting the use of a reagent for in situ soil remediation is shown in FIG. 1. The reagent is fed from the feed tank (10) to the soil through an infiltration well or gallery (15). The reagent is allowed to pass through the contaminated soil. The mixture containing the contaminant is then collected in recovery well (20). The term "mixture" is defined as an admixture composed of the contaminant and a solvent, which also includes solutions of the contaminant in the solvent. The mixture may also contain varying amounts of reagent. The contaminant may be soluble in the solvent, which is referred to as a solution. The contaminant may also be partially soluble or insoluble in the solvent. Typically, the solvent in the mixture comprises groundwater that is recovered during the process.

The mixture containing the contaminant is directed toward the recovery well (20) using techniques known in the art. In one embodiment, the mixture comprising the contaminant is mobilized through the soil by the use of a pump, electroremediation, (i.e., an electrokinetic process), a drain, a collection gallery, a collection basin, a collection trench, a vertical well, or a horizontal well.

Figure 2:
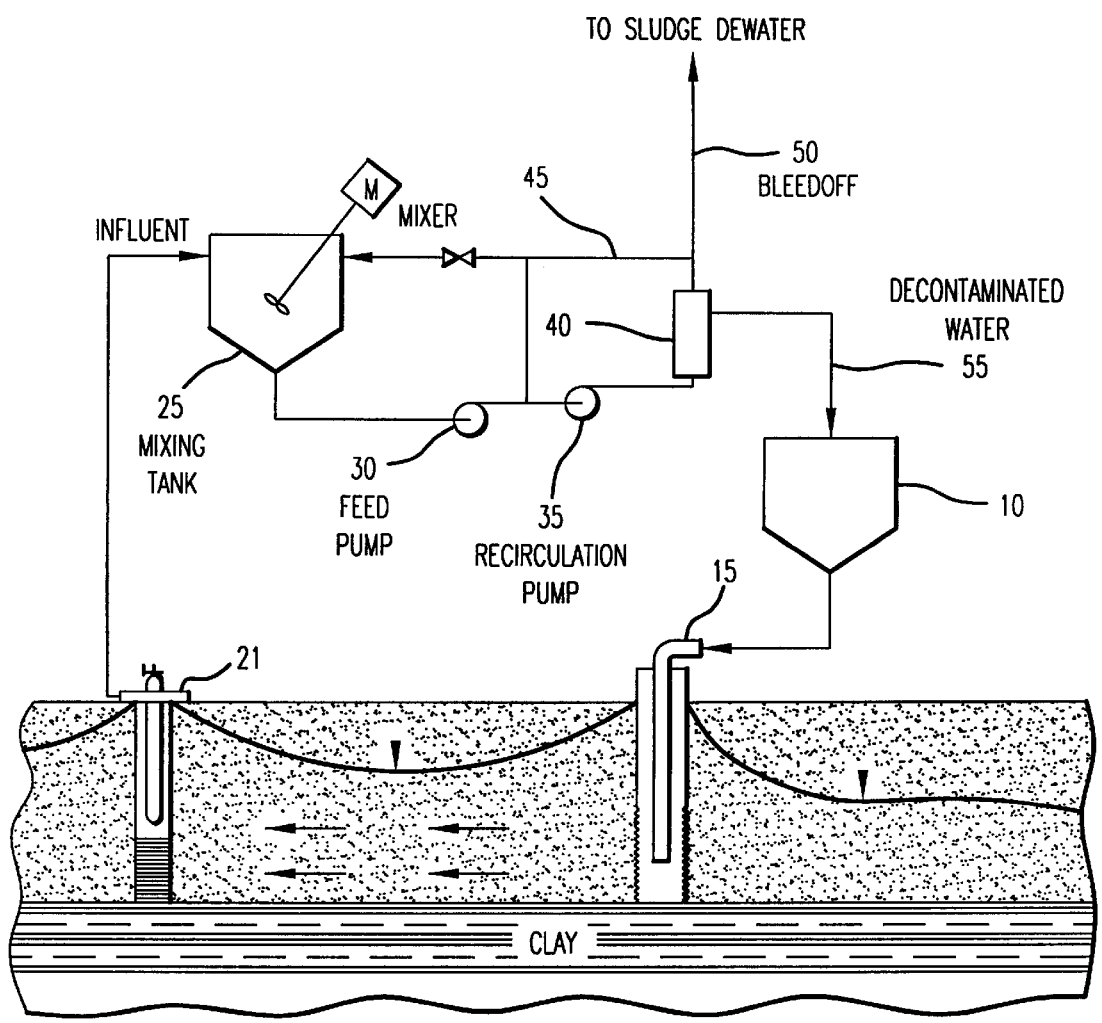
FIG. 2 is a schematic drawing that depicts one embodiment of the present invention for the in situ removal of a contaminant from soil. The process is identical to that depicted in FIG. 1, with the exception that an electrode (21) is used to mobilize the contaminant via electroremediation.

In a preferred embodiment, the mixture comprising the contaminant is mobilized by electroremediation techniques. U.S. Pat. No. 5,405,509 to Lomasney et al. and U.S. Pat. No. 5,616,235 to Acar et al., which disclose the use of electroremediation for the remediation of soil, is herein incorporated by reference in its entirety. In one embodiment, the soil is contacted with the reagent followed by mobilization of the contaminant by electroremediation. This embodiment is depicted in FIG. 2, wherein an electrode (21) is used to conduct the electroremediation process. In one embodiment, the electrode can be placed in the recovery well.

Once the mixture comprising the contaminant has been removed from the soil and collected into the recovery well (20), the mixture is fed into a mixing tank (25). In the mixing tank, a salt can be added to the mixture to induce floc formation. Not wishing to be bound by theory, it is believed that during floc formation, the contaminant adsorbs or absorbs onto the floc, or the contaminant chemically reacts with the floc to produce a contaminant-floc complex. In one embodiment, the salt comprises a calcium salt, an aluminum salt, or an iron salt. Preferably, an iron salt is used to induce floc formation. Examples of iron salts include, but are not limited to, ferric chloride, ferric sulfate, or a combination thereof From the mixing tank, the mixture is fed to a filter, clarifier, or membrane (40) by the feed pump (30) and recirculation pump (35) in order to remove the contaminant-floc complex. The mixture comprising the contaminant-floc complex will permeate into the filter, clarifier, or membrane in a perpendicular fashion. As the flow continues through the a channel of the filter, clarifier, or membrane, the suspended solid levels increase, and the resulting higher concentrate waste stream cycles back into the mixing tank via line (45).

In one embodiment, the membrane is a dual porosity, cross-flow ceramic membrane. Ceramic membranes are also referred in the art as inorganic membranes. The ceramic membranes disclosed and discussed in *Inorganic Membranes Synthesis, Characteristics, and Applications* by Ramesh Bhave, Van Nostrand Reinhold, 1991, which is herein incorporated by reference in its entirety, are useful in the present invention. Cross-flow filtration is performed as a continuous process with the feed stream moving parallel to the membrane while removing a particle tangentially through the membrane. The use of the ceramic membrane to filter and remove the contaminant-floc complex is preferred because it is efficient with respect to the removal of the contaminant-floc complex having small particle sizes or diameters.

The ceramic membranes typically exist as hexagonal rods. Depending upon the application, two or more ceramic membranes can be stacked on top of each other in order to increase the efficiency of the filtration. The ceramic membranes manufactured by Membralox and Coors Ceramic Company are useful in the present invention. In one embodiment, Membralox Microfilter, which is composed of 99.96% alpha alumina, is used as the ceramic membrane. The pore size of Membralox Microfilter is from 0.2 to 5.0 $\mu$m, preferably 0.2, 0.5, 0.8, 1.4, 3.0, or 5.0 $\mu$m. In another embodiment, Membralox Ultrafilter, which is composed of gamma alumina, is used as the ceramic membrane. The pore size of Membralox Ultrafilter is from 0.05 to 1.0 $\mu$m, preferably 0.05, 0.1, 0.5, or 1.0 $\mu$m. In another embodiment, Membralox Ultrafilter, which is composed of zirconia alumina, is used as the ceramic membrane. The pore size of Membralox Ultrafilter is from 0.2 to 1.0 $\mu$m, preferably 0.2, 0.5, 0.7, or 1.0 $\mu$m. Typically, the channel diameter of the ceramic membranes are from 2 to 50 mm in diameter, preferably 2 to 10 mm in diameter, and more preferably 4 to 7 mm in diameter. The length of the ceramic membrane is generally from 50 to 500 mm, preferably 250 mm.

After the mixture passes through the filter, clarifier, or membrane in FIGS. 1 and 2, the decontaminated mixture is deposited into the feed tank (10) via line (55). The decontaminated mixture is substantially free of the contaminant. The decontaminated mixture is continuously being fed back into the soil with the reagent until the contaminant is substantially removed from the soil.

The methods of the present invention can remove a variety of contaminants from the soil. In one embodiment, the contaminant is an inorganic compound, such as a heavy metal. Examples of contaminants that can be removed by the present invention include, but are not limited to, alkali metal compounds, alkali earth metal compounds, transition metal compounds, group III compounds (Li, Na, K, Rb, Cs, Fr), group II compounds (Be, Mg, Ca, Sr, Ba, Ra), group II compounds (B, Al, Ga, In, Tl), group IV compounds (C, Si, Ge, Sn, Pb), group V compounds (N, P, As, Sb, Bi), group VI compounds (O, S, Se, Te, Po), group VII compounds (F, Cl, Br, I, At), lanthanide compounds, or actinide compounds. In one embodiment, the contaminant is an arsenic compound, a copper compound, a chromium compound, a mercury compound, a lead compound, or a zinc compound, preferably an arsenic compound.

Any desired amount of contaminant can be removed from the soil by using any of the processes of the present invention. Typically, the amount of contaminant that is removed from the soil depends upon the type of contaminant and the reagent or chelate that is employed. The present invention can typically remove a contaminant to below detectable levels.

The present invention can remove a contaminant from the soil much more effectively and efficiently when compared to prior art techniques. A variety of soils can be treated by using the process of the present invention. Any soil that is permeable enough to allow the reagent or chelate to pass through the soil can be treated by the present invention. Generally, the soil is less than 50% silt and clay.

The amount of soil that can be treated by the methods of the present invention can vary depending upon the type of soil being treated and the amount of contaminant that is present in the soil. Because the methods of the present invention are a continuous process, any amount of soil that contains a contaminant can be removed over a given period of time. Another advantage of the present invention is that the contaminant can be removed at an accelerated rate when compared to prior art techniques. In one embodiment, the contaminant can be removed from the soil at from 2 to 100 times, typically 2 to 15 times, faster than prior art techniques.

In a preferred embodiment, the process for in situ soil remediation comprises:
 a) contacting the soil containing the arsenic compound in situ with phosphoric acid to form a mixture;
 b) mobilizing the mixture by electroremediation;
 c) removing the mixture from the soil;
 d) adding an iron salt to the mixture to form an arsenic-floc complex; and e) contacting the mixture containing the arsenic-floc complex with a ceramic membrane to thereby remove the arsenic-floc complex.

In Situ Removal of a Contaminant from Soil Using a Chelate

The invention further relates to a method for removing a contaminant in situ from soil containing the contaminant, comprising:

a) contacting the soil containing the contaminant in situ with a chelate to form a mixture comprising a contaminant-chelate complex;

b) removing the mixture from the soil; and c) contacting the mixture with an ion exchange resin, whereby the contaminant-chelate complex is separated from the mixture.

The invention further relates to a method for removing a contaminant in situ from soil containing the contaminant, comprising:

a) contacting the soil containing the contaminant with a chelate in situ to form a mixture comprising a contaminant-chelate complex;

b) mobilizing the mixture by electroremediation;

c) removing the mixture from the soil; and d) contacting the mixture with an ion exchange resin, whereby the contaminant-chelate complex is separated from the mixture.

The invention further relates to a method of removing a contaminant in situ from soil containing the contaminant, comprising:

a) contacting the soil containing the contaminant with a chelate in situ to form a first mixture comprising a contaminant-chelate complex;

b) removing the first mixture from the soil;

c) chemically destroying the contaminant-chelate complex of the first mixture to produce a second mixture comprising the contaminant; and d) removing the contaminant from the second mixture.

The invention further relates to a method of removing a contaminant in situ from soil containing the contaminant, comprising:

a) contacting the soil containing the contaminant with a chelate in situ to form a first mixture comprising a contaminant-chelate complex;

b) mobilizing the first mixture by electroremediation;

c) removing the first mixture from the soil;

d) chemically destroying the contaminant-chelate complex of the first mixture to produce a second mixture comprising the contaminant; and e) removing the contaminant from the second mixture.

In the present invention, the addition of a chelate to soil can remove a contaminant from the soil. A "chelate" is defined herein as any compound that possesses two or more nonmetal atoms that are capable of coordinating with the contaminant. The nonmetal atoms present in the chelate are also referred to as ligands. Chelates are also referred to in the art as sequestering agents or chelating agents. In the present invention, the chelate coordinates to the contaminant to produce a contaminant-chelate complex. Any of the metal contaminants listed above can be removed by the addition of a chelate to the soil.

The selection of the chelate is dependent upon the contaminant to be removed from the soil. Examples of chelates useful in the present invention are disclosed in *Kirk-Othmer Encyclopedia of Chemical Technology,* Fourth Edition, Volume 5, John Wiley & Sons, 1992, pp. 768–769; *Organic Sequestering Agents,* Chaberek et al., John Wiley & Sons Inc., 1959, pp. 505–507; and *Chemistry of the Metal Chelate Compounds,* Martell et al., Prentice-Hall Inc. 1956, pp. 510–513, which are herein incorporated by reference in their entirety.

Examples of chelates useful in the present invention include, but are not limited to, a polyphosphate (e.g., sodium tripolyphosphate and hexametaphosphoric acid), an aminocarboxylic acid (e.g., ethylenediaminetetraacetic acid, hydroxyethylenediaminetriacetic acid, nitriloacetic acid, N-dihydroxyethylglycine, N,N'ethylethylenediaminetetraacetic acid, N-hydroxyethylethylenediaminetriacetic acid, N, N'dihydroxyethylethylenediaminetriacetic acid, diethylenetriaminepentaacetic acid, 1,2-diaminocyclohexanetetracetic acid, or ethylenebis (hydrophenylglycine)), a 1,3-diketone (e.g., acetylacetone, trifluoroacetylacetone, or thenoyltrifluoroacetone), a hydroxycarbocylic acid (e.g., tartaric acid, citric acid, gluconic acid, or 5-sulfosalicyclic acid), a polyamine (e.g., ethylenediamine, diethylenetriamine, triethylenetetramine, tetrakis($\beta$-aminoethyl)-ethylenediamine, N,N'-dimethyleneethylenediamine, 1,3-diaminopropane, 1,2-diaminopropane, or triaminotriethylamine), an aminoalcohol (e.g., triethanolamine, N,N'-dihydroxyethyl-ethylenediamine, or N-hydroxyethylethylenediamine), an aromatic heterocyclic base (e.g., dipyridyl or o-phenanthroline), a phenol (e.g., salicylaldehyde, disulfopyrocatechol, or chromotropic acid), an aminophenol (e.g., 8-hydroxyquinoline oxine or oxine sulfonic acid), an oxime (e.g., dimethylgloxime or salicylaldoxime), a Schiff base (e.g., disalicylaldehyde 1,2-propylenediimine), a tetrapyrrole (e.g., tetraphenylporphin or phthalocyanine), a sulfur compound (e.g., toluenedithiol, dimercaptopropanol, thioglycolic acid, potassium ethyl xanthate, sodium diethyldithiocarbamate, dithizone, diethyl dithiophosphoric acid, or thiourea), a synthetic macrocyclic compound (e.g., dibenzo-[18]-crown-6, hexamethyl-[14]-4,11-diene $N_4$, or 2.2.2-cryptate), a polymer (e.g., polyethyleneimine, polymethacryloylacetone, or poly(p-vinylbenzyliminodiacetic acid)), a phosphonic acid (e.g., nitrilotrimethylenephosphonic acid, ethylenediaminetetra-(methylenephosphonic acid), or hydroxyethylidenediphosphonic acid), or a combination thereof. In a preferred embodiment, the chelate comprises citric acid, oxalic acid, ethylenediaminetetraacetic acid, or a combination thereof, more preferably citric acid.

The chelate can be added to the soil using the techniques described above for the addition of the reagent to the soil. Typically, the chelate is introduced to the soil as a solution. Preferably, the chelate comprises an aqueous solution. In one embodiment, the chelate comprises an aqueous solution, wherein the solution is from 2 to 20 parts by weight chelate and from 100 to 10,000 parts by weight water. In another embodiment, the chelate comprises an aqueous solution of from 2 to 20 parts, 3 to 19 parts, 4 to 18 parts, 5 to 17 parts, 6 to 16 parts, 7 to 15 parts, 8 to 14 parts, 9 to 13 parts, or 10 to 12 parts by weight chelate and 1,000 parts by weight water.

The techniques described above for introducing the reagent to the soil, mobilizing the contaminant, and collecting the mixture containing the contaminant can be used when using a chelate to remove a contaminant. In a preferred embodiment, when a chelate is used to remove a contaminant from the soil, the contaminant is mobilized by electroremediation.

Figure 3:
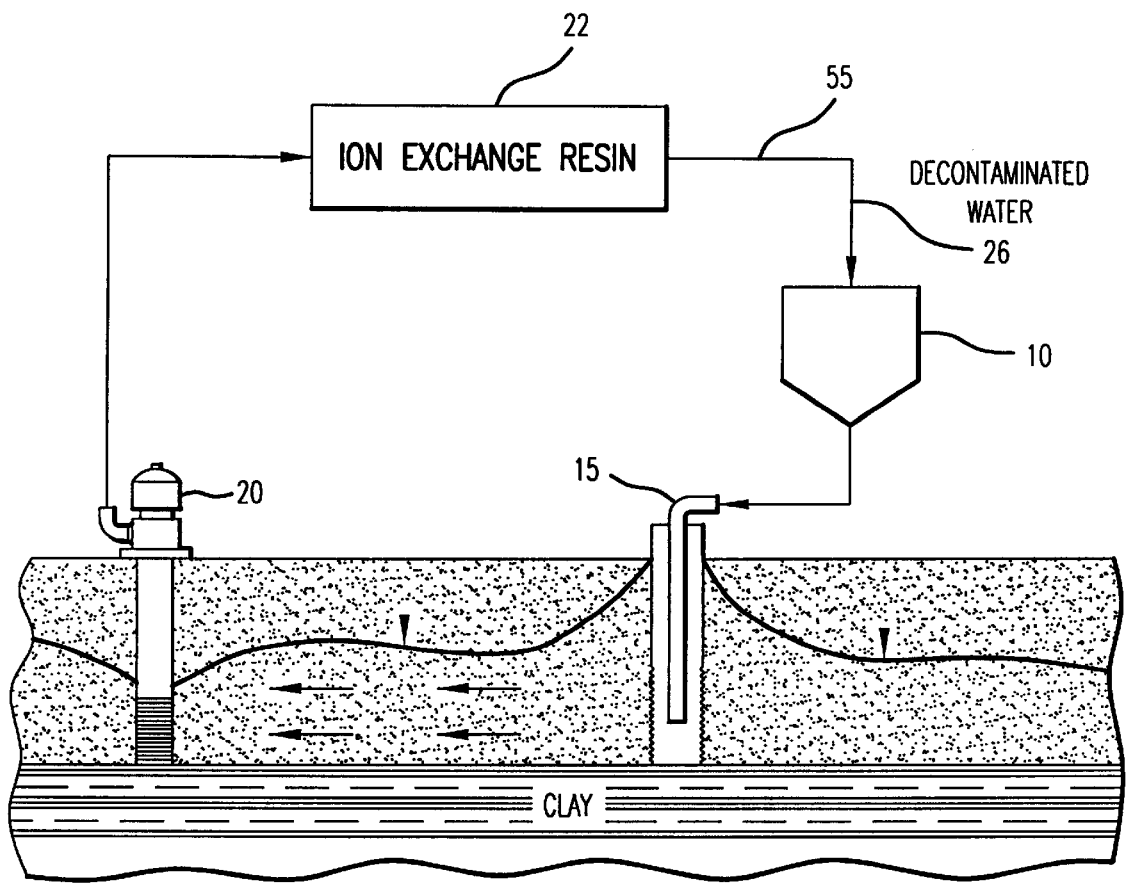
FIG. 3 is a schematic drawing that depicts one embodiment of the present invention for the in situ removal of a contaminant from soil. In this embodiment, a reagent is introduced to the soil from the feed tank (10), and the mixture containing the contaminant is collected at the recovery well (20). The mixture containing the contaminant is passed through an ion exchange resin (22). The decontaminated mixture is then fed back into the feed tank via line (55), where it is re-introduced into the soil with additional chelate.
Figure 4:
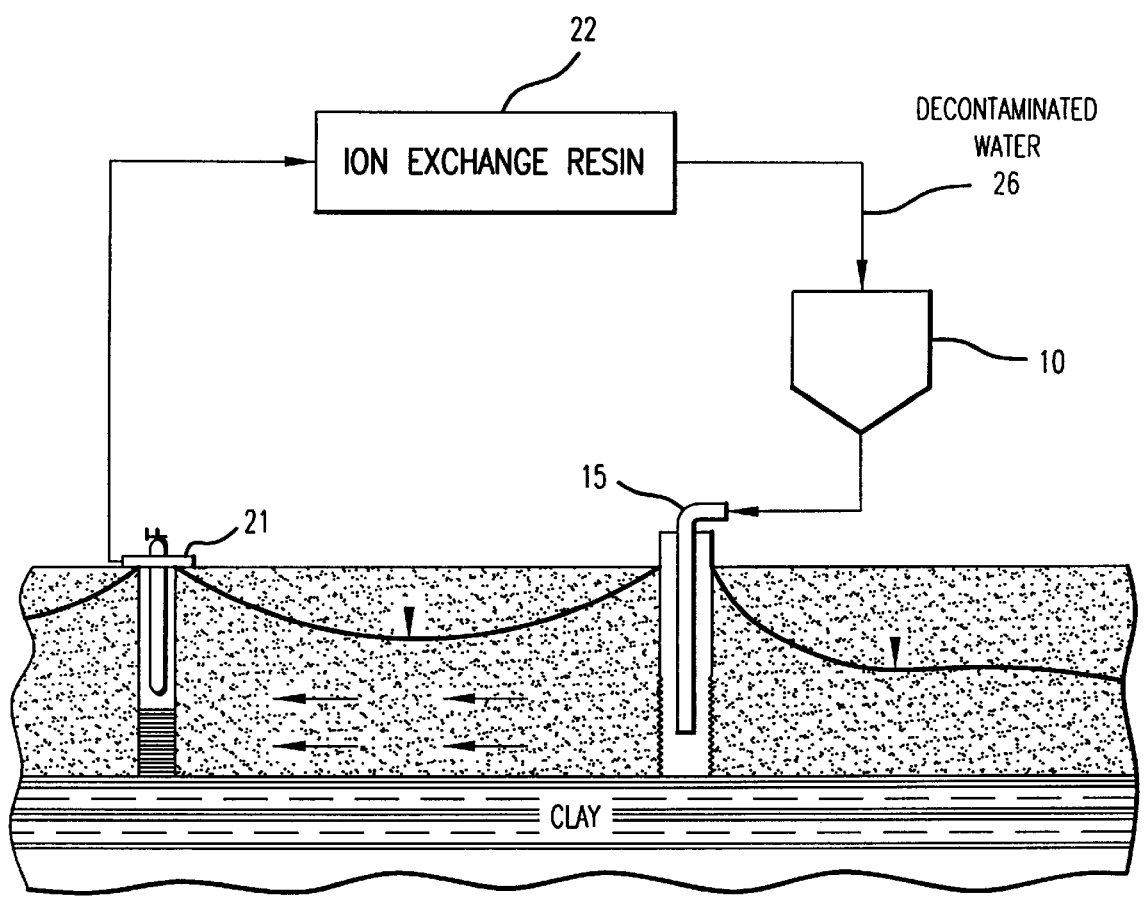
FIG. 4 is a schematic drawing that depicts one embodiment of the present invention for the in situ removal of a contaminant from soil. In this embodiment, the process is identical to that disclosed in FIG. 3, with the exception that an electrode (21) is used to mobilize the contaminant via electroremediation.

The schematic drawing in FIG. 3 depicts the use of an ion exchange resin for the in situ removal of a contaminant from soil. In the feed tank (10), the chelate is introduced through an infiltration well or gallery (15). The chelate is passed through the soil in order to remove the contaminant from the soil to produce the contaminant-chelate complex, and the mixture is removed from the soil by recovery well (20). The chelate can interact with the contaminant in a number of ways to produce the contaminant-chelate complex. In a preferred embodiment, once the contaminant-chelate complex is formed it is mobilized through the soil via electroremediation. This embodiment is depicted in FIG. 4 with the use of electrode (21). The mixture comprising the contaminant-chelate complex is then removed from the soil using the techniques described, and is fed into a vessel containing an ion exchange resin (22).

The type of ionic exchange resin that is selected depends upon the contaminant that is to be removed. The ionic exchange resin can be anionic, cationic, or neutral. The ion exchange resins disclosed in *Ion Exchange Resins* by Robert Kunin, Krieger Publishing Co., 1990, can be used in the present invention. The ion exchange resin is generally composed of a polymer including, but not limited to, polystyrene, polyacrylic, polypropylene, polymethyl acrylate, or a combination thereof. Typically, the polymer has functional groups, which determines if the resin is cationic, anionic, or neutral. Examples of functional groups include, but are not limited to, sulfonic acid, a carboxylic acid, a quaternary amine, or a tertiary amine. The ion exchange resin can also be composed of particles such as activated carbon, manganese, or zeolite. Ion exchange resins manufactured by the Dow Chemical Company, Rohm & Haas, and Purolite are useful in the present invention. The use of ion exchange resins for water treatment is disclosed in U.S. Pat. No. 5,310,488 to Hansen et al. and U.S. Pat. No. 4,272,494 to Ljubman, which are herein incorporated by reference in their entirety.

Examples of anionic ion exchange resins include, but are not limited to, DOWEX MARATHON A, DOWEX MARATHON A MB, DOWEX MARATHON A LB, DOWEX MARATHON A2, DOWEX 11, DOWEX SBR-P, DOWEX SBR, DOWEX SAR, DOWEX MSA-1, DOWEX MSA-2, DOWEX MONOSPHERE 550A, DOWEX SBR-PC, DOWEX SBR C, DOWEX MSA-1C, DOWEX MARATHON WBA, DOWEX WGR-2, DOWEX MWA-1, DOWEX IF-59 PS, or DOWEX MONOSPHERE 600BB, which are manufactured by the Dow Chemical Company, AMBERLITE IRA958 Cl, AMBERLITE IRA404 Cl, AMBERLITE IRA410 Cl, AMBERJET 4600 Cl, AMBERJET 4200 Cl, AMBERLITE IRA67, AMBERLITE IR96, AMBERLITE 4200 Cl, AMBERLITE IRA402 Cl, AMBERLITE IRA900 Cl, AMBERLITE IRA910 Cl, AMBERLITE IRA458 Cl, AMBERLITE IRA478RF Cl, AMBERLITE IRA67RF, AMBERLITE IRA96RF, AMBERLITE IRA458RF Cl, AMBERLITE RF14, AMBERLITE IRA96SB, AMBERJET 4400 Cl, AMBERJET 4400 OH, or AMBERSEP 900 OH, which are manufactured by Rohm & Haas, or PUROLITE A200, PUROLITE A300, PUROLITE A400, PUROLITE A420S, PUROLITE A500, PUROLITE A500P, PUROLITE A505, PUROLITE A510, PUROLITE A600, PUROLITE A850, PUROLITE A860, PUROLITE A870, PUROLITE SGA400, PUROLITE SGA600, PUROLITE A501P, or PUROLITE S108, which are manufactured by Purolite.

Examples of cationic ion exchange resins include, but are not limited to, DOWEX MARATHON C, DOWEX HCR-S, DOWEX HGR, DOWEX MSC-1, DOWEX MONOSPHERE 650 C, DOWEX HCR-W2, DOWEX HGR-W2, DOWEX MSC-1, or DOWEX MAX-3, which are manufactured by the Dow Chemical Company, AMBERJET 1200 Na, AMBERLITE IR120 Na, AMBERLITE IR122 Na, AMBERLITE 200 Na, AMBERLITE IRC86, AMBERJET 1200 H, AMBERLITE IRC86SB, AMBERJET 1500 H, or AMBERSEP 200 H, which are manufactured by Rohm & Haas, or PUROLITE CC100E, PUROLITE S920, PUROLITE S930, PUROLITE S940, or PUROLITE S950, which are manufactured by Purolite.

In a preferred embodiment, when arsenic is the contaminant, the ion exchange resin comprises an anionic exchange resin.

After the mixture comprising the contaminant-chelate complex is passed through the ion-exchange resin in FIGS. 3 and 4, the decontaminated mixture is substantially free of the contaminant. The solution is then fed into tank (10) via line (26), where it is re-introduced into the soil with additional chelate. As described above, the decontaminated mixture is continuously fed into the soil with the chelate until the contaminant is substantially removed from the soil.

In a preferred embodiment, the process for in situ soil remediation comprises:
 a) contacting the soil containing the arsenic compound with citric acid in situ to form a mixture comprising an arsenic-citric acid complex;
 b) mobilizing the mixture by electroremediation;
 c) removing the mixture from the soil; and
 d) contacting the mixture with an anionic ion exchange resin, whereby the arsenic-citric acid complex is separated from the mixture.

In another embodiment, once the contaminant-chelate complex has been formed and removed from the soil, the contaminant-chelate complex is chemically destroyed in order to produce the free contaminant in the mixture. The phrase "chemically destroying" as used herein refers to a chemical reaction that converts the contaminant-chelate complex to the free contaminant. The chemical destruction of the contaminant-chelate complex liberates the contaminant from the contaminant-chelate complex.

The contaminant-chelate complex can be destroyed using techniques known in the art, and will vary depending upon the chelate that is used as well as the contaminant to be removed from the soil. In one embodiment, the contaminant-chelate complex is chemically destroyed by ozonation, oxidation, photocatalysis, bioremediation, ultraviolet radiation, or a combination thereof. Depending upon the technique used to chemically destroy the contaminant-chelate complex, the chemical destruction step can also chemically destroy any free or unreacted chelate that may be present in the mixture after the mixture is removed from the soil. The chemical destruction of the free chelate can prevent the chelate from reforming the contaminant-chelate complex has been chemically destroyed. Additionally, some chelates of the present can inhibit floc formation when a salt is added to the mixture. Therefore, if necessary, the present invention can be tailored to chemically destroy the contaminant-chelate complex and optionally the chelate, which ultimately increases the efficiency of the process of the present invention.

Figure 5:
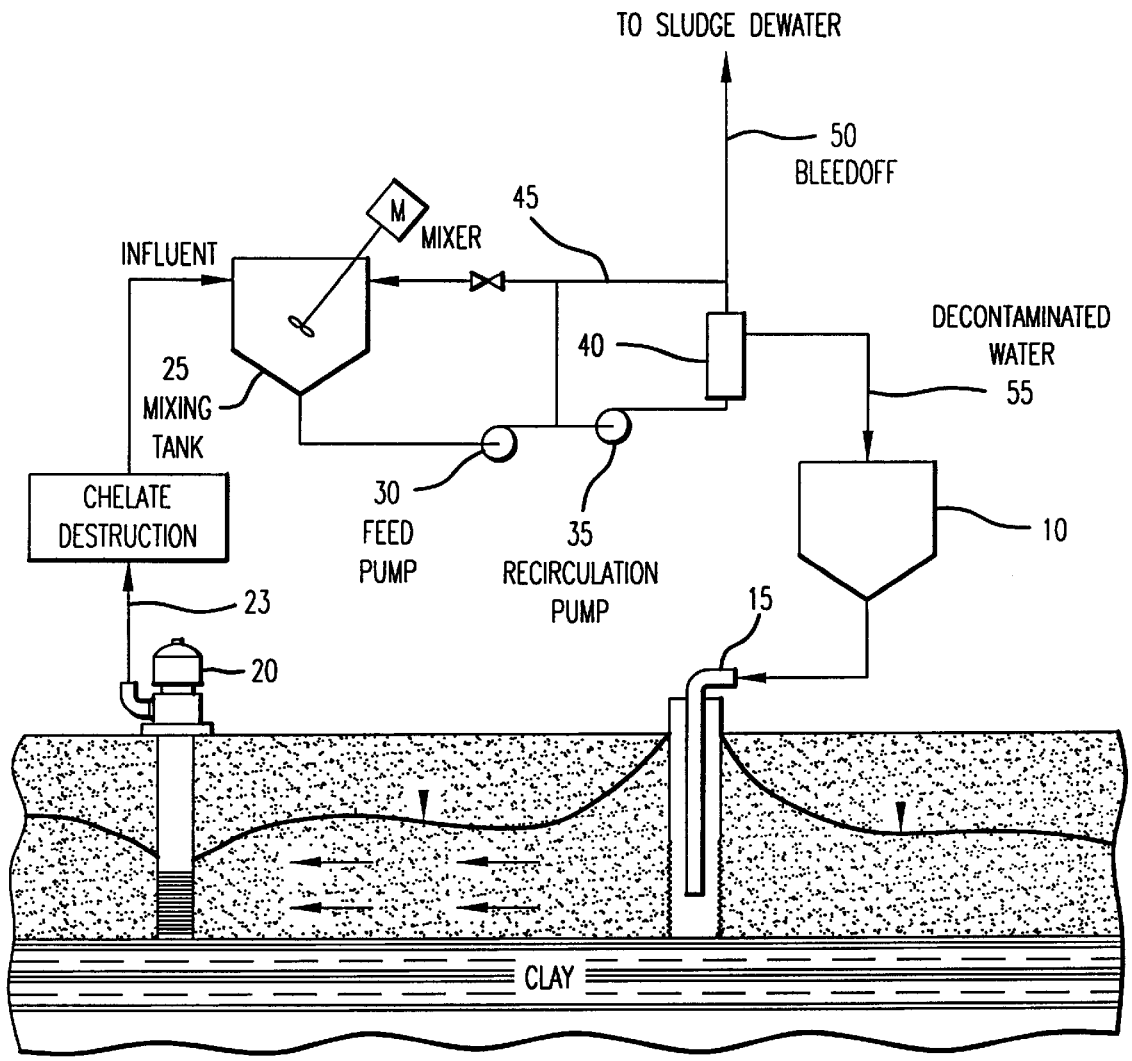
FIG. 5 is a schematic drawing that depicts one embodiment of the present invention for the in situ removal of a contaminant from soil. In this embodiment, a reagent is introduced to the soil from the feed tank (10), and the mixture containing the contaminant is collected at the recovery well (20) and fed into the mixing tank (25). Prior to being fed to the mixing tank (25), the contaminant-chelate complex is chemically destroyed in line (23). Once the contaminant-chelate complex is destroyed, the contaminant is removed from the mixture via contaminant-floc formation and filtration.
Figure 6:
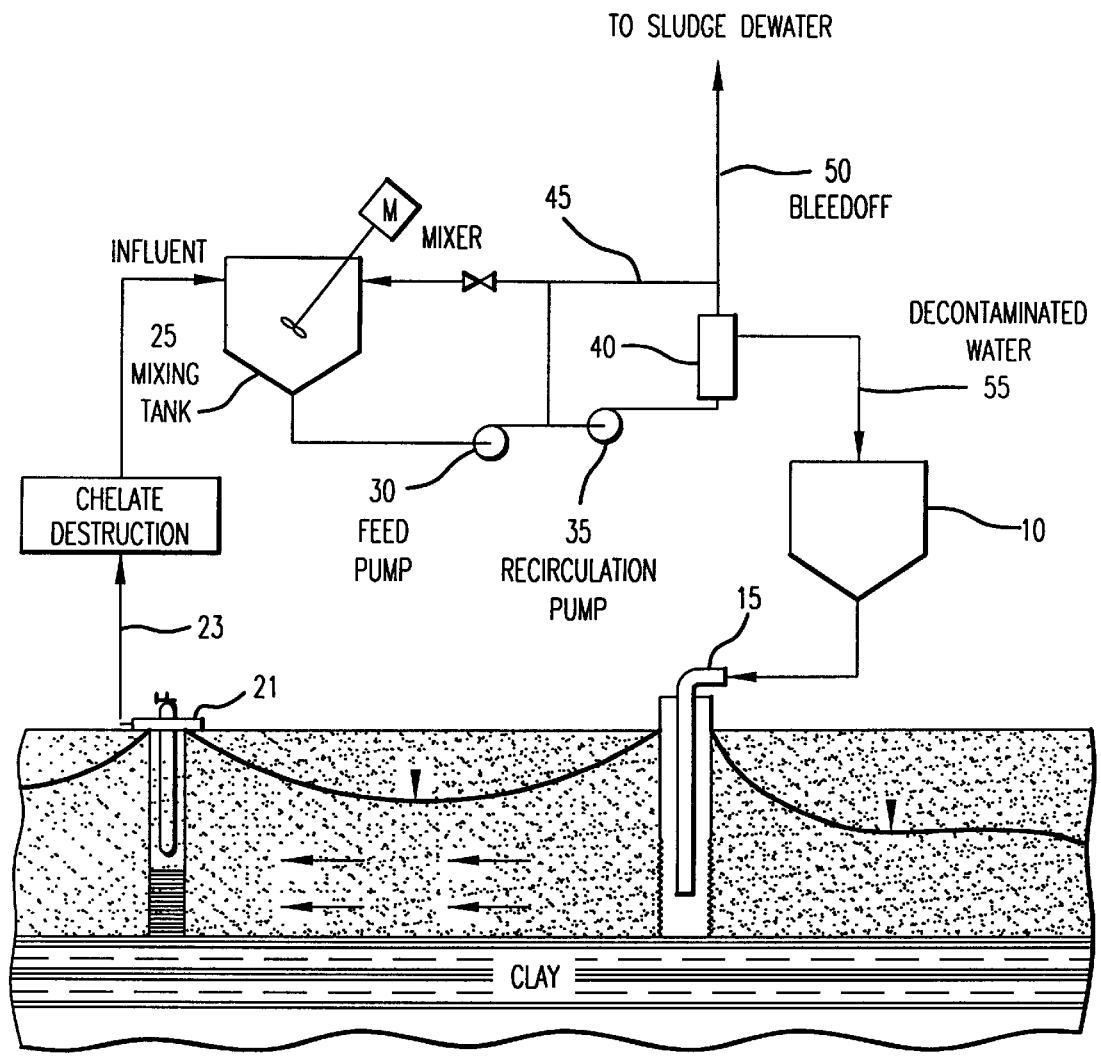
FIG. 6 is a schematic drawing that depicts one embodiment of the present invention for the in situ removal of a contaminant from soil. In this embodiment, the process is identical to that depicted in FIG. 5, with the exception that an electrode (21) is used to mobilize the contaminant via electroremediation.

A schematic depicting the chemical destruction of the contaminant-chelate complex is shown in FIG. 5. Using the techniques described above, the chelate is introduced through the soil from feed tank (10), which produces the contaminant-chelate complex. The contaminant-chelate complex is mobilized through the soil using the techniques described above. In a preferred embodiment, the mixture is mobilized by electroremediation, which is depicted in FIG. 6. The mixture comprising the contaminant-chelate complex as well as any unreacted or free chelate is collected at recovery well (20). The contaminant-chelate complex is then chemically destroyed prior to entering mixing tank (25).

Generally, the chemical destruction step is conducted prior to removing the contaminant from the mixture. In one embodiment, the contaminant-chelate complex is chemically destroyed by ozonation. The use of ozone for the chemical destruction of a contaminant-chelate complex in solution is disclosed in U.S. Pat. No. 4,846,978 to Legget et al.; U.S. Pat. No. 4,289,594 to Aplaugh et al.; and U.S. Pat. No. 5,492,633 to Moniwa et al., which are herein incorporated by reference in their entirety. A general procedure for chemically destroying the contaminant-chelate complex by ozonation involves connecting an ozone generator to line (23) in FIGS. 5 and 6. The mixture containing the contaminant-complex is exposed to ozone for a sufficient time to chemically destroy the majority of the contaminant-chelate complex. Ozone generators useful in the present invention are known in the art.

In another embodiment, the contaminant-chelate complex is chemically destroyed by oxidation. Examples of oxidants useful in the present invention include, but are not limited to, hydrogen peroxide, fluorine, chlorine, bromine, potassium permanganate, hypochlorous acid, hypochlorite, chlorine dioxide, or oxidative enzymes such as peroxidase. Fenton's reaction can also be used to oxidize the chelate. In this reaction, ferrous ions react with hydrogen peroxide to produce hydroxyl free radicals, which can oxidize the contaminant-chelate complex and/or chelate. The amount of oxidant used will vary depending upon the type and amount of chelate that is used. Typically, the oxidant will be fed to line (23) prior to entering the mixing tank.

In another embodiment, ultraviolet radiation is used to chemically destroy the contaminant-chelate complex. In one embodiment, the addition of an oxidant to the mixture containing the contaminant-chelate complex followed by exposing the mixture to ultraviolet light results in the chemical destruction of the contaminant-chelate complex. In another embodiment, ultraviolet radiation is used in combination with ozonation to chemically destroy the contaminant-chelate complex. U.S. Pat. No. 4,289,594 to Aplaugh et al. disclose a process for waste treatment by contacting a solution containing copper ions and a complexing agent with ozone gas followed by irradiation with UV light.

In another embodiment, the contaminant-chelate complex is destroyed by bioremediation. In this embodiment, microorganisms chemically react and destroy the contaminant-chelate complex. The microorganisms can be naturally present in the groundwater of the soil that is being treated or they can be added to the mixture containing the contaminant-chelate complex in line (23) in FIGS. 5 and 6 once the mixture has been removed from the soil. Bioremediation is well known in the art for the chemical destruction of metal-chelate complexes. For example, U.S. Pat. No. 5,292,456 to Francis et al., which is incorporated by reference in its entirety, disclose the biological degradation of metal-citrate complexes.

Once the contaminant-chelate complex has been destroyed, the mixture containing the free contaminant is fed into mixing tank (25), where the contaminant is removed using techniques described above. In one embodiment, the addition of a salt to induce floc formation can be used to remove the contaminant from the mixture. Typically, the salt comprises a calcium salt, an aluminum salt, or an iron salt, preferably ferric chloride, ferric sulfate, or a combination thereof. Depending upon the salt that is used to induce floc formation, the chemical destruction of any free chelate present in the mixture can facilitate floc formation. By increasing floc formation, the efficiency of the process ultimately increases with respect to removing the contaminant from the mixture.

Although the chemical destruction of the contaminant-chelate complex generally occurs before the removal of the contaminant from the mixture, the chemical destruction step and removing step can be performed together. In one embodiment, an iron salt and hydrogen peroxide are added to mixing tank (25) in FIGS. 5 and 6, then the resultant mixture is exposed to ultraviolet radiation. As described above, the ultraviolet light converts hydrogen peroxide into hydroxyl free radicals, which can chemically react with the contaminant-chelate complex. Additionally, the ultraviolet radiation reduces ferric ions to ferrous ions. By adjusting the pH, the ferrous ions produce a floc that traps the contaminant. Thus, in this embodiment, it is possible to perform the chemical destruction step and removing step in situ in the mixing tank.

After floc formation, the floc comprising the contaminant can be filtered through membrane, clarifier, or filter (40) via the feed pump (30) and recirculation pump (35). In a preferred embodiment, the membrane is any of the ceramic membranes described above. After filtration, the decontaminated mixture is once again fed into feed tank (10), where it is re-introduced into the soil with additional chelate in order remove any remaining contaminant(s) that may be present in the soil.

In a preferred embodiment, the in situ removal of the contaminant comprises:

a) contacting the soil containing the arsenic compound with citric acid in situ to form a first mixture comprising an arsenic-citric acid complex;

b) mobilizing the first mixture by electroremediation;

c) removing the first mixture from the soil;

d) chemically destroying the arsenic-citric acid complex of the first mixture by ozonation, oxidation, or a combination thereof to produce a second mixture comprising the arsenic compound;

e) adding an iron salt to the second mixture to produce a third mixture comprising an arsenic-floc complex; and f) filtering the third mixture comprising the arsenic-floc complex with a ceramic membrane.

EXAMPLES

The following examples are put forth so as to provide those of ordinary skill in the art with a complete disclosure and description of how the methods claimed herein are evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature and pressure is at or near atmospheric.

Example 1

In Situ Removal of Arsenic From Soil

Using the process depicted in FIG. 1, 0.01 M (0.1% by weight) aqueous phosphoric acid was injected into the surficial aquifer via gravity feed to seven wells. The water containing the arsenic was recovered through eleven pumping wells. Iron coprecipitation was performed by introducing 40% ferric chloride at a feed rate of 10 to 13 mL/minute into a 10 gpm stream. A Membralox ceramic membrane (8 $\mu$m pore size) was used to filter the contaminant-floc complex.

Figure 7:
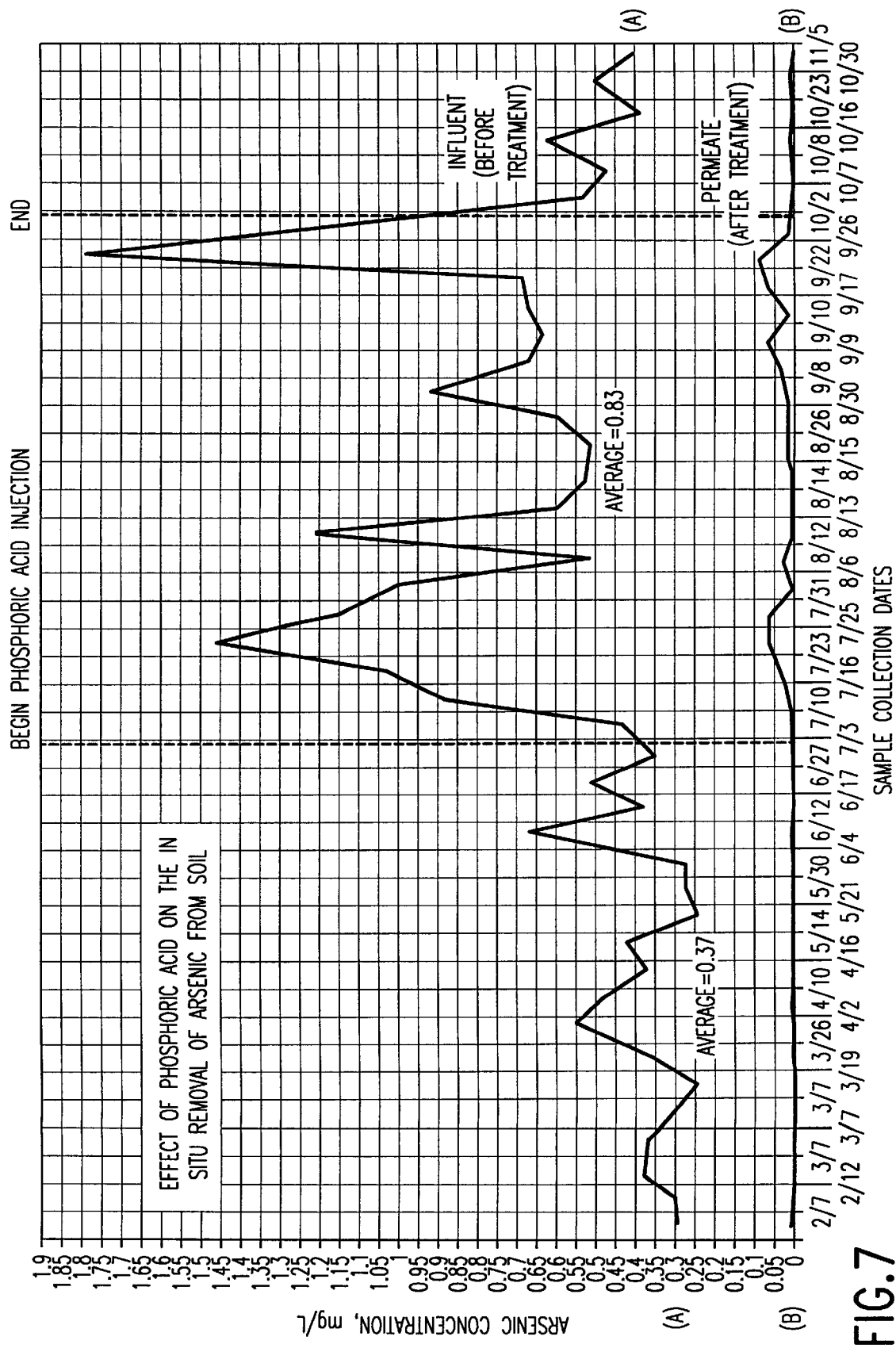
FIG. 7 is a graph that shows the effect of phosphoric acid on the in situ removal of arsenic from soil. The top graph (A) reveals the amount of arsenic removed from the soil after treatment with phosphoric acid. The bottom graph (B) reveals the amount of arsenic that was removed from the contaminated groundwater and re-introduced into the soil.

Samples were taken from the water prior to entry into the mixing tank (influent) and from water taken after treatment (effluent), and the amount of arsenic was measured for each sample. The results are shown in FIG. 7, which reveals that when phosphoric acid was injected into the soil (7/3–10/2), the average amount of arsenic present in the influent (0.83 mg/L) was greater than the average amount of arsenic present in the influent (0.37 mg/L) when no phosphoric acid was injected into the soil (2/7–7/2). This data indicates that phosphoric acid is an effective reagent for removing arsenic from soil.

The bottom graph indicates that the amount of arsenic remaining in the ground water after floc formation and filtration through the ceramic membrane. The average amount of arsenic present in the water from 7/3 to 10/2 after floc formation and ceramic membrane filtration was 0.024 mg/L, which corresponds to a 97% average removal of arsenic from ground water using the process of the present invention. Therefore, the data in Example 1 reveals that the in situ process of the present invention (1) efficiently removes arsenic from soil and (2) efficiently removes the arsenic from the groundwater once the groundwater has been removed from the soil.

Example 2

Using the same process described in Example 1, 0.01 M citric acid was injected into the soil. When 40% ferric chloride was added to the influent water, no floc formation was observed when compared to the floc formed in Example 1. The results in Example 2 demonstrate that by not chemically destroying the arsenic-citric acid complex prior to removing the arsenic, floc formation does not occur, which ultimately corresponds to no removal of arsenic from the groundwater.

Example 3

Figure 8:
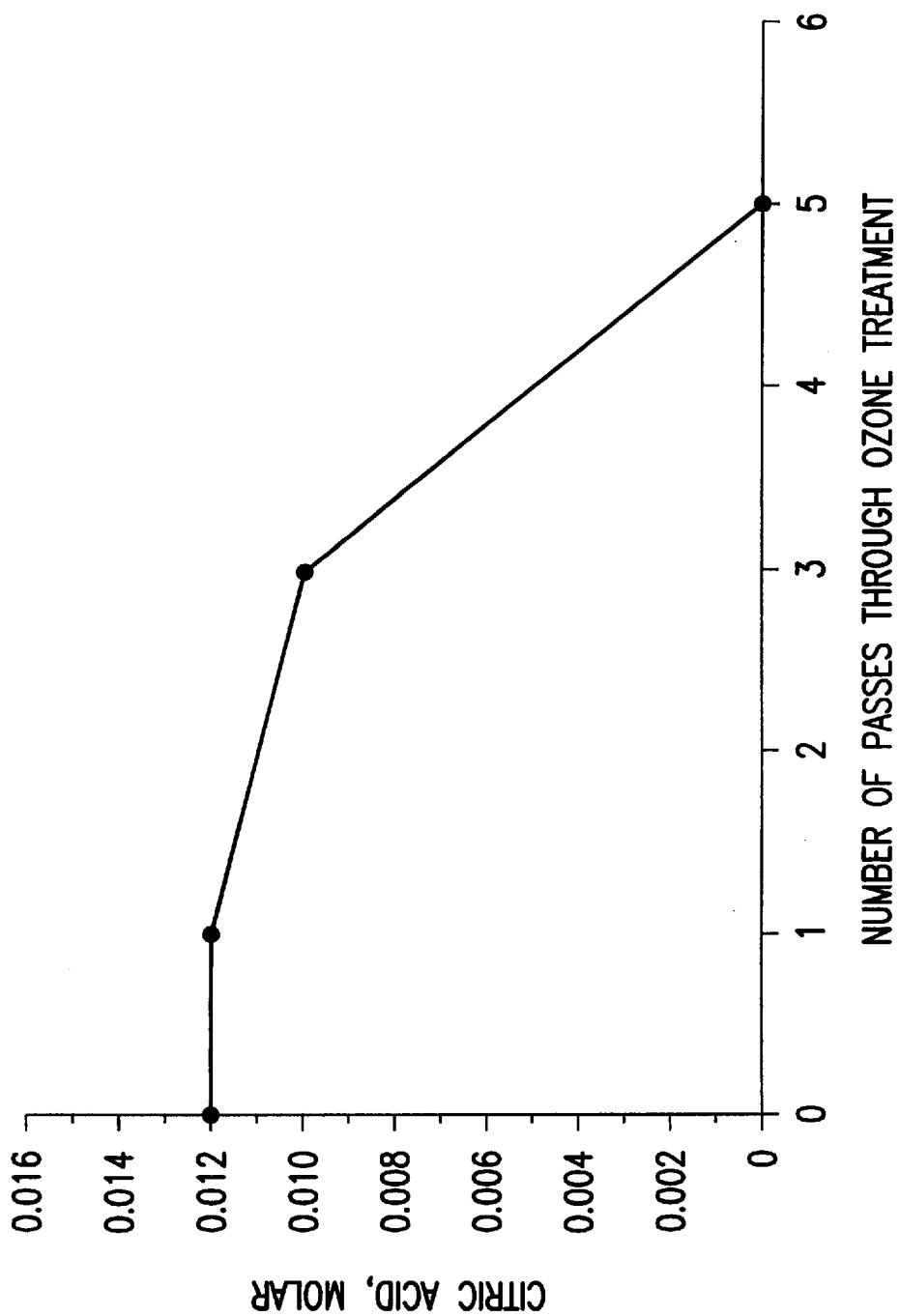
FIG. 8 is a graph that shows the chemical destruction of citric acid by ozonation.

This example demonstrates that ozonation can be used to chemically destroy a contaminant-chelate complex. Raw groundwater (18.9 L) containing arsenic and iron was treated with 36.6 grams of 95% citric acid powder in order to produce a 0.01 M citric acid solution. The pH of the solution was 2.89. The groundwater was passed through an ozone treatment system for a total of 5 passes. The amount of citric acid present in the groundwater was determined in the first, third, and fifth passes (FIG. 8). At the fifth pass, no citric acid was detected. To one liter of solution from the fifth pass was added 0.35 mL of 40% ferric chloride in water. The pH was raised to 6.24 by the addition of 4.5 mL of 6 N NaOH, at which time flocculation was observed. An additional 2.11 mL of ferric chloride solution was added in 0.35 mL increments to achieve total flocculation, while maintaining the pH between 6.0 to 6.5. The sample was filtered and analyzed for arsenic and iron. The amount of iron present was 0.14 mg/L (detection limit >0.02 mg/L). The amount of arsenic present was below detection limits (>0.001 mg/L).

Example 4

Figure 9:
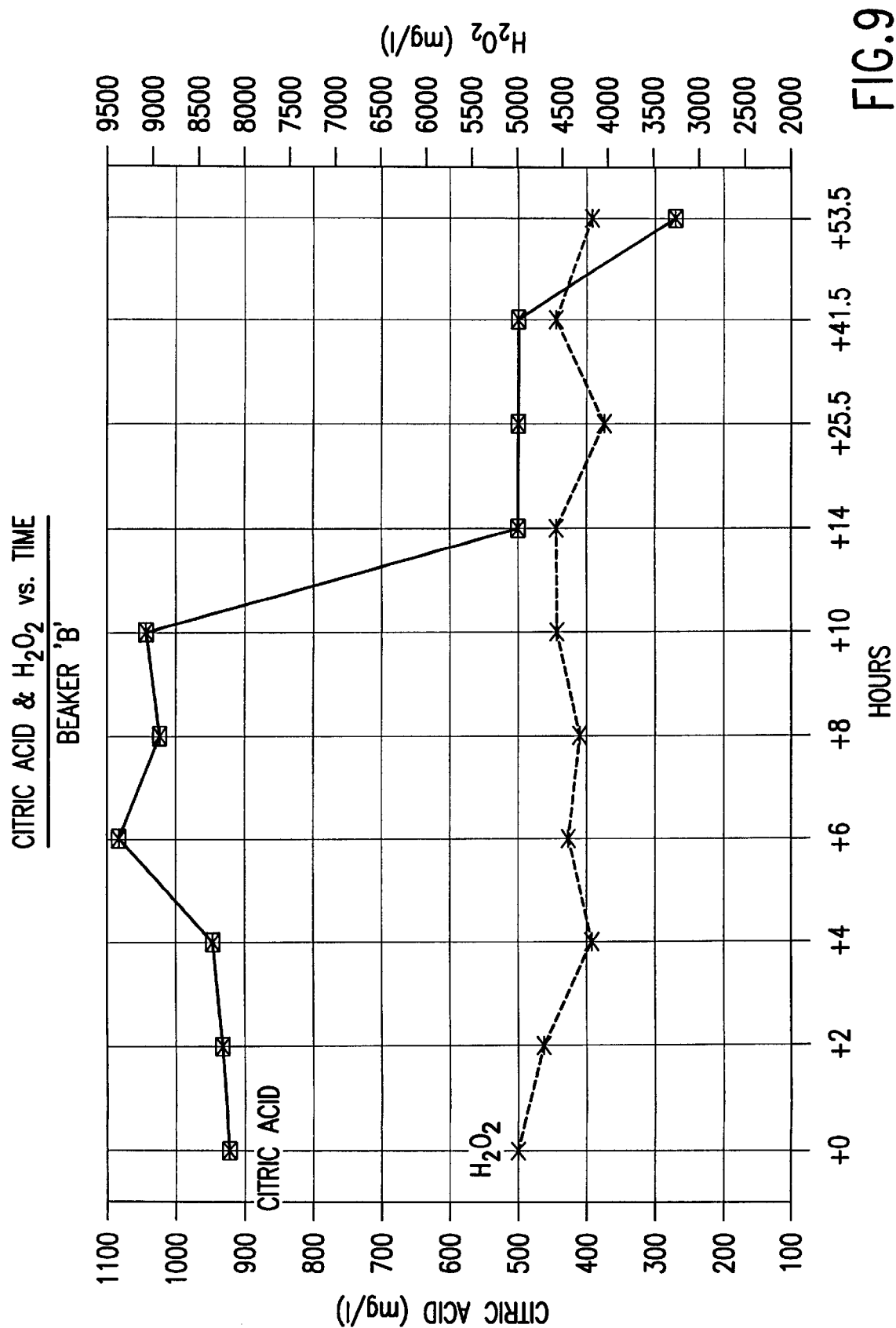
FIG. 9 is a graph that shows the chemical destruction of citric acid via hydrogen peroxide oxidation.

This example demonstrates that oxidation can be used to chemically destroy citric acid, which is a chelate of the present invention. An aqueous citric acid solution (920 mg citric acid per liter of water) was prepared. To this solution, 7 mL of 50% hydrogen peroxide was added, and the amount of citric acid was determined over time. After 14 hours, the citric acid concentration was reduced by 46% (FIG. 9).

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for removing a contaminant in situ from soil containing the contaminant, comprising:
    a) contacting the soil containing the contaminant in situ with a reagent to remove the contaminant from the soil and to form a mixture comprising the contaminant;
    b) removing the mixture from the soil;
    c) forming a floc in the mixture to form a contaminant-floc complex; and
    d) contacting the mixture containing the contaminant-floc complex with a ceramic membrane to thereby remove the contaminant-floc complex,
wherein the reagent is not citric acid.

2. The method of claim 1, wherein the reagent comprises a Lewis acid, a Lewis base, a Bronsted acid, a Bronsted base, or a mixture thereof.

3. The method of claim 1, wherein the reagent comprises a phosphorus compound.

4. The method of claim 1, wherein the reagent comprises a phosphate.

5. The method of claim 1, wherein the reagent is phosphoric acid.

6. The method of claim 1, wherein the reagent comprises an aqueous solution, and the aqueous solution comprises one part by weight reagent and from 100 to 10,000 parts by weight water.

7. The method of claim 1, wherein in step (a), the soil is contacted by the reagent by injection, gallery infiltration, basin infiltration, trench infiltration, surface infiltration, irrigation, spray, flooding, a sprinkler, a leach field, a vertical well, or a horizontal well.

8. The method of claim 1, further comprising after step (a) and prior to step (b), mobilizing the mixture by a pump, a drain, a collection gallery, a collection basin, a collection trench, a vertical well, or a horizontal well.

9. The method of claim 1, further comprising after step (a) and prior to step (b), mobilizing the mixture comprising the contaminant by electroremediation.

10. The method of claim 1, wherein in step (b), the mixture is removed from the soil by a recovery well.

11. The method of claim 1, wherein step (c) comprises adding a salt to the mixture comprising the contaminant.

12. The method of claim 11, wherein the salt comprises a calcium salt, an aluminum salt, or an iron salt.

13. The method of claim 11, wherein the salt comprises ferric chloride, ferric sulfate, or a combination thereof.

14. The method of claim 1, wherein the ceramic membrane comprises a dual porosity, cross flow ceramic membrane.

15. The method of claim 1, wherein the ceramic membrane comprises alpha alumina and has a pore size of from 2 to 50 µm.

16. The method of claim 1, wherein the ceramic membrane comprises gamma alumina and has a pore size of from 0.5 to 1.0 µm.

17. The method of claim 1, wherein the ceramic membrane comprises zirconia alumina and has a pore size of from 0.2 to 1.0 µm.

18. The method of claim 1, wherein the contaminant comprises an alkali metal compound, an alkali earth metal compound, a transition metal compound, a group III–VIII compound, a lanthanide compound, or an actinide compound.

19. The method of claim 1, wherein the contaminant comprises a copper compound, a chromium compound, a mercury compound, a lead compound, or a zinc compound.

20. The method of claim 1, wherein the contaminant comprises an arsenic compound.

21. A method for removing an arsenic compound in situ from soil containing the arsenic compound, comprising:
   a) contacting the soil containing the arsenic compound in situ with phosphoric acid to form a mixture;
   b) mobilizing the mixture by electroremediation;
   c) removing the mixture from the soil;
   d) adding an iron salt to the mixture to form an arsenic-floc complex; and
   e) contacting the mixture containing the arsenic-floc complex with a ceramic membrane to thereby remove the arsenic-floc complex.

22. A method for removing a contaminant in situ from soil containing the contaminant, comprising:
   a) contacting the soil containing the contaminant in situ with a chelate to form a mixture comprising a contaminant-chelate complex;
   b) removing the mixture from the soil; and
   c) contacting the mixture with an ion exchange resin, whereby the contaminant-chelate complex is separated from the mixture.

23. The method of claim 22, wherein the chelate comprises a polyphosphate, an aminocarboxylic acid, a 1,3-diketone, a hydroxycarboxylic acid, a polyamine, an aminoalcohol, an aromatic heterocyclic base, a phenol, an aminophenol, a Schiff base, a sulfur compound, a synthetic macrocyclic compound, a phosphonic acid, or a mixture thereof.

24. The method of claim 22, wherein the chelate comprises oxalic acid, ethylenediaminetetraacetic acid, or a combination thereof.

25. The method of claim 22, wherein the chelate comprises citric acid.

26. The method of claim 22, wherein the chelate comprises an aqueous solution, and the aqueous solution comprises from 2 to 20 parts by weight chelate and from 100 to 10,000 parts by weight water.

27. The method of claim 22, wherein in step (a), the soil is contacted by the reagent by injection, gallery infiltration, basin infiltration, trench infiltration, surface infiltration, irrigation, spray, flooding, a sprinkler, a leach field, a vertical well, or a horizontal well.

28. The method of claim 22, further comprising after step (a) and prior to step (b), mobilizing the mixture by a pump, a drain, a collection gallery, a collection basin, a collection trench, a vertical well, or a horizontal well.

29. The method of claim 22, further comprising after step (a) and prior to step (b), mobilizing the mixture by electroremediation.

30. The method of claim 22, wherein in step (b), the mixture is removed from the soil by a recovery well.

31. The method of claim 22, wherein the ion exchange resin comprises an anionic exchange resin, a cationic exchange resin, or a neutral exchange resin.

32. The method of claim 22, wherein the contaminant comprises an alkali metal compound, an alkali earth metal compound, a transition metal compound, a group III–VIII compound, a lanthanide compound, or an actinide compound.

33. The method of claim 22, wherein the contaminant comprises an arsenic compound.

34. A method for removing an arsenic compound in situ from soil containing the arsenic compound, comprising:
   a) contacting the soil containing the arsenic compound with citric acid in situ to form a mixture comprising an arsenic-citric acid complex;
   b) mobilizing the mixture by electroremediation;
   c) removing the mixture from the soil; and
   d) contacting the mixture with an anionic ion exchange resin, whereby the arsenic-citric acid complex is separated from the mixture.

35. A method for removing a contaminant in situ from soil containing the contaminant, comprising:
   a) contacting the soil containing the contaminant with a chelate in situ to form a mixture comprising a contaminant-chelate complex;
   b) mobilizing the mixture by electroremediation;
   c) removing the mixture from the soil; and
   d) contacting the mixture with an ion exchange resin, whereby the contaminant-chelate complex is separated from the mixture.

36. A method of removing a contaminant in situ from soil containing the contaminant, comprising:
   a) contacting the soil containing the contaminant with a chelate in situ to form a first mixture comprising a contaminant-chelate complex;
   b) removing the first mixture from the soil;
   c) chemically destroying the contaminant-chelate complex of the first mixture to produce a second mixture comprising the contaminant; and
   d) removing the contaminant from the second mixture.

37. The method of claim 36, wherein the chelate comprises a polyphosphate, an aminocarboxylic acid, a 1,3-diketone, a hydroxycarboxylic acid, a polyamine, an aminoalcohol, an aromatic heterocyclic base, a phenol, an aminophenol, a Schiff base, a sulfur compound, a synthetic macrocyclic compound, a phosphonic acid, or a mixture thereof.

38. The method of claim 36, wherein the chelate comprises oxalic acid, ethylenediaminetetraacetic acid, or a combination thereof.

39. The method of claim 36, wherein the chelate comprises citric acid.

40. The method of claim 36, wherein the chelate comprises an aqueous solution, and the aqueous solution comprises from 2 to 20 parts by weight chelate and from 100 to 10,000 parts by weight water.

41. The method of claim 36, wherein in step (a), the soil is contacted by the reagent by injection, gallery infiltration, basin infiltration, trench infiltration, surface infiltration, irrigation, spray, flooding, a sprinkler, a leach field, a vertical well, or a horizontal well.

42. The method of claim 36, further comprising after step (a) and prior to step (b), mobilizing the mixture by a pump, a drain, a collection gallery, a collection basin, a collection trench, a vertical well, or a horizontal well.

43. The method of claim 36, further comprising after step (a) and prior to step (b), mobilizing the mixture comprising the contaminant by electroremediation.

44. The method of claim 36, wherein in step (b), the first mixture is removed from the soil by a recovery well.

45. The method of claim 36, wherein when the first mixture comprises a free chelate, step (c) further comprises chemically destroying the free chelate.

46. The method of claim 36, wherein step (c) comprises photocatalysis, bioremediation, or a combination thereof.

47. The method of claim 36, wherein step (c) comprises ozonation.

48. The method of claim 36, wherein step (c) comprises oxidation with an oxidant, and the oxidant comprises hydrogen peroxide, fluorine, chlorine, bromine, permanganate, hypochlorous acid, hypochlorite, chlorine dioxide, or an oxidative enzyme.

49. The method of claim 36, wherein step (c) comprises exposing the first mixture with ultraviolet radiation.

50. The method of claim 36, wherein step (d) comprises (1) adding a salt to the second mixture to produce a resultant mixture comprising the contaminant-floc complex and (2) filtering the resultant mixture comprising the contaminant-floc complex with a membrane, filter, or clarifier.

51. The method of claim 50, wherein the salt comprises a calcium salt, an aluminum salt, or an iron salt.

52. The method of claim 50, wherein the salt comprises ferric chloride, ferric sulfate, or a combination thereof.

53. The method of claim 50, wherein the membrane comprises a dual porosity, cross flow ceramic membrane.

54. The method of claim 36, wherein the contaminant comprises an alkali metal compound, an alkali earth metal compound, a transition metal compound, a group III–VIII compound, a lanthanide compound, or an actinide compound.

55. The method of claim 36, wherein the contaminant comprises an arsenic compound.

56. A method for removing an arsenic compound in situ from soil containing the arsenic compound, comprising:
   a) contacting the soil containing the arsenic compound with citric acid in situ to form a first mixture comprising an arsenic-citric acid complex;
   b) mobilizing the first mixture by electroremediation;
   c) removing the first mixture from the soil;
   d) chemically destroying the arsenic-citric acid complex of the first mixture by ozonation, oxidation, or a combination thereof to produce a second mixture comprising the arsenic compound;
   e) adding an iron salt to the second mixture to produce a third mixture comprising an arsenic-floc complex; and
   f) filtering the third mixture comprising the arsenic-floc complex with a ceramic membrane.

57. A method of removing a contaminant in situ from soil containing the contaminant, comprising:
   a) contacting the soil containing the contaminant with a chelate in situ to form a first mixture comprising a contaminant-chelate complex;
   b) mobilizing the first mixture by electroremediation;
   c) removing the first mixture from the soil;
   d) chemically destroying the contaminant-chelate complex of the first mixture to produce a second mixture comprising the contaminant; and
   e) removing the contaminant from the second mixture.

* * * * *